Patented July 25, 1950

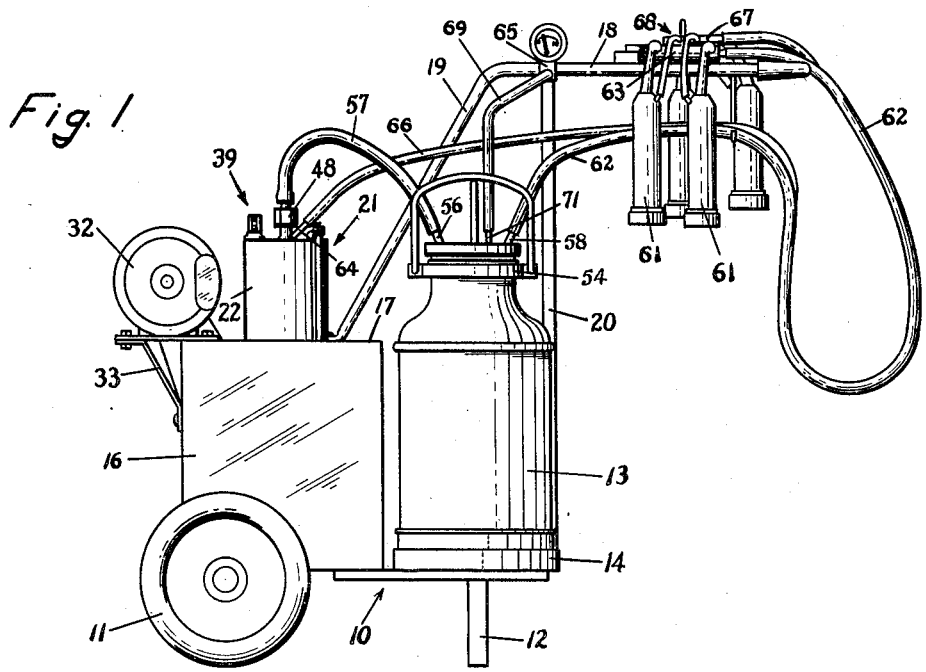
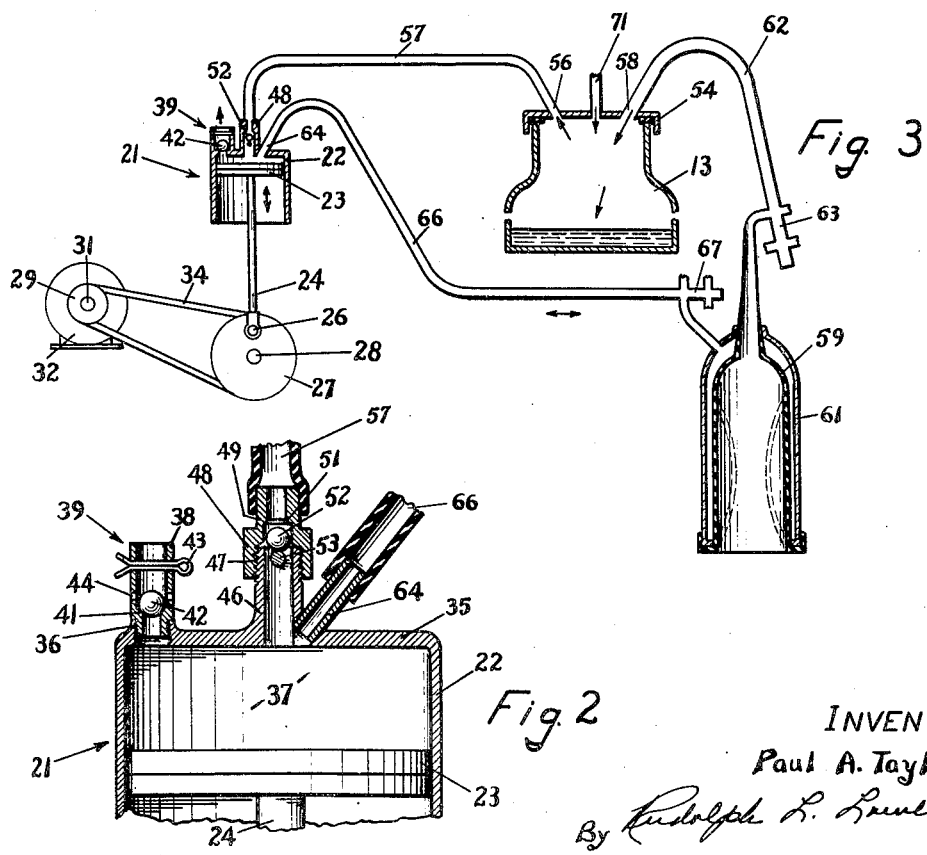

2,516,354

UNITED STATES PATENT OFFICE 2,516,354

PULSATOR APPARATUS FOR MILKING MACHINES

Paul A. Taylor, Des Moines, Iowa, assignor to Ideal Manufacturing Company, Des Moines, Iowa, a corporation of Iowa Application January 31, 1949, Serial No. 73,692

1 Claim. (Cl. 31—73)

This invention relates generally to milking machines and in particular to a pulsator apparatus for a milking machine.

An object of this invention is to provide an improved milking machine of the pulsator type.

Another object of this invention is to provide a pulsator apparatus for a milking machine which is of a simple and compact construction and has all of the fluid passages therein readily accessible for cleaning purposes.

A further object of this invention is to provide a pulsator apparatus for a milking machine in which the alternately high and low working pressures of a reciprocating pump are utilized to operate inflation type teat cups and to provide for the air in the space of a milk receptacle being at a subatmospheric pressure.

Still another object of this invention is to provide a pulsator apparatus for a milking machine which is entirely free of the milk flow through the machine.

A feature of this invention is found in the provision of a pulsator apparatus for a milking machine in which a valve unit carried on a pump cylinder has one end open to the cylinder chamber and its opposite end connected to the space in a milk receptacle. Conventional type teat cups have their air tubes connected to the cylinder chamber and their milk tubes to the milk receptacle. The valve unit has a valve member which moves to a seated position when the piston in the cylinder moves through its working stroke, and to an open position on the return stroke of the piston.

Further objects, features and advantages of this invention will become apparent from the following description when taken in connection with the accompanying drawings, in which:

Fig. 1 is a side elevational view of a portable milking machine embodying the pulsator apparatus of this invention;

Fig. 2 is an enlarged fragmentary longitudinal sectional view of the pulsator apparatus of this invention, and Fig. 3 is a diagrammatic view of the air and milk systems in the machine shown in Fig. 1.

With reference to the drawings, the pulsator apparatus is illustrated in Fig. 1, as applied to a milking machine having a portable frame 10, carried on ground wheels 11 and provided with a rest leg or standard 12.

A milk receptacle or can 13 is carried at the rear end of the frame 10, within a retainer ring 14, and an upright housing 16, having a flat top side 17, is located at the front end of the frame.

A handle unit 18, for transporting the machine from place to place, is suitably supported by brace members 19 and 20 secured to the housing 16 and frame 10, respectively.

The pulsator apparatus of this invention includes a reciprocating pump, indicated generally at 21 (Figs. 2 and 3) having an upright cylinder 22 and an associated piston 23. The cylinder 22, as shown in Fig. 1, is mounted on the top side 17 of the housing 16, and the piston, as illustrated in Fig. 3, is provided with a connecting rod 24 extended downwardly into the housing 16 and having its lower end eccentrically connected at 26 to a crank pulley 27 mounted on a shaft 28. The pulley 27 is in a driven relation with a pulley 29 mounted on the shaft 31 of an electric motor 32, which is carried on a bracket structure 33 secured to the housing 16. A belt 34 operatively connects the pulleys 27 and 29.

The cylinder head 35 (Fig. 2) is formed adjacent one side thereof with an upright internally threaded boss 36, open to the cylinder chamber 37, and adapted to threadably receive a tubular sleeve 38 which forms part of an air bleeder or exhaust valve, designated generally as 39, for limiting the maximum pressure within the cylinder chamber 37.

Spaced from the lower end of the sleeve 38 is a seat 41 for a ball valve 42. A stop pin 43 extended transversely through the sleeve 38 at a position near its upper end, limits the upward movement of the valve 42 away from the seat 41. Exhaust ports 44 are provided in the sleeve 38 between the stop pin 43 and the valve seat 41, so that on opening of the valve 42, air from the cylinder chamber 37 is exhausted through the ports 44 and the upper end of the tubular sleeve 38.

Projected upwardly from the center of the cylinder head 35 is a tubular body member 46 having its lower end open to the cylinder chamber 37 and its upper end externally threaded at 47 for threadable connection with a coupling 48, having a reduced upper section 49. Formed within the coupling 48 and at the lower end of its reduced section 49, is a downwardly facing valve seat 51 for a ball valve member 52. A stop pin 53, carried in the tubular member 46 at a spaced position below the seat 51, limits the downward movement of the ball valve 52.

A cover 54 (Figs. 1 and 3) for the milk can 13 is provided with an air connection 56 which is connectible with the coupling 48 by a hose member 57. A milk connection 58 on the cover 54, is connected with the inflation 59 of a teat cup 61 through a hose connection 62 and a milk unit 63. An air connection 64, carried on the cylinder head 35 and open to the cylinder chamber 37, is connected through a hose member 66 and an air unit 67 with the teat cup 61. The milk unit 63 and the air unit 67 comprise a claw structure, designated generally at 68, and shown in Fig. 1 as applied to a cluster of four teat cups 61.

In the operation of the pulsator apparatus, assume the pump piston 23 to be in its down stroke position. On the upstroke or working stroke of the piston 23, and the resultant build up of air pressure within the cylinder chamber 37, the ball valve 52 is moved upwardly from its rest position on the stop pin 53 into seating engagement with the seat 51, as shown in dotted lines in Fig. 2, whereby to stop the flow of any air under pressure into the milk receptacle 13. Concurrently with this closing of the valve member 52, air under pressure is supplied through the hose 66 to the teat cup 61 to compress the inflation 59, as illustrated in dotted lines in Fig. 3. As the air pressure in the chamber 37 reaches its maximum value as determined by the bleeder valve 39, the valve 42 is moved upwardly from its seated position to provide for the exhaust of air from the cylinder chamber 37 through the exhaust ports 44 and the upper end of the tubular member 38.

From a consideration of Figs. 2 and 3, it will be seen that the ball valve 42 is of a greater size, and therefore heavier, than the ball valve 52. As a result of this weight difference, the valve 52, in response to the air pressure within the cylinder 37, is moved into its closed position against the seat 51 prior to any opening movement of the valve 42. A positive sealing of the milk can 13 from the action of high pressure air in the machine is thus accomplished.

On a return, or downstroke of the piston 23, the valve 42 is returned to its closed position, and the valve 52 is returned to its open position against the stop 53. As a result, air is exhausted from the receptacle 13 through the hose connection 57, concurrently with the exhausting of air from the inflation 61 through the hose 66. The milk receptacle 13 is thus maintained at a subatmospheric pressure and the inflation 59 is permitted to expand to its full line position shown in Fig. 3. During each complete cycle of movement of the piston 23, therefore, the inflation 59 is expanded and contracted by the alternate supply of high and low pressure air to the teat cups 61 in direct response to the reciprocal movement of the piston 23, and air is exhausted from the milk receptacle 13.

In order to maintain the air within the receptacle 13 at a predetermined subatmospheric pressure, there is provided a bleeder valve indicated generally at 65 (Fig. 1) open at one end to the atmosphere and fluid connected through a hose connection 69 with an air connection 71 carried on the receptacle cover 54. The operation of the bleeder valve 65 is such that when a predetermined subatmospheric pressure is obtained within the receptacle 13, the valve 65 is opened to permit the flow of atmospheric air into the receptacle.

Although the invention has been described with respect to a preferred embodiment thereof, it is to be understood that it is not to be so limited since changes can be made therein which are within the full intended scope of this invention as defined by the appended claim.

I claim:

A pulsator apparatus for a milking machine having a milk receptacle, an air tube, and a milk tube connectible with a teat cup, said apparatus comprising a reciprocating pump having a cylinder and a working piston therein, a valve unit on said cylinder including an upright tubular body member open at its lower end to the working chamber within said cylinder, a ball valve member within said tubular body member movable upwardly to a seated position therefor, an upright exhaust valve of ball type for limiting the maximum pressure of air within said working chamber having a ball member movable downwardly to a seated position therefor, a first fluid connection between the space in said receptacle and the milk tube, a second fluid connection between said air tube and said working chamber, and a third fluid connection between the upper end of said tubular body member and said receptacle, with the ball member in said exhaust valve being of a heavier weight than the ball member in said valve unit so that said valve unit ball member, on a working stroke of said piston, is moved into its seated position to close said third fluid connection to provide for the supply of high pressure air to said air tube, prior to the upward movement of said exhaust valve member away from a seated position therefor, and with said valve unit ball member being returned to its open position and said exhaust valve ball member to its closed position, on a return stroke of said piston, to provide for the exhausting of air from said air tube and milk receptacle.

PAUL A. TAYLOR.

REFERENCES CITED

The following references are of record in the file of this patent:

UNITED STATES PATENTS

| Number | Name | Date |
|---|---|---|
| 870,395 | Teese | Nov. 5, 1907 |